United States Patent
Johann et al.

(10) Patent No.: US 7,416,664 B2
(45) Date of Patent: Aug. 26, 2008

(54) WATER-CONDITIONING CARTRIDGE

(75) Inventors: Jürgen Johann, Nussloch (DE);
Monique Bissen, Mondsee (AT);
Werner Neubacher, St. Georgen im Attergau (AT); Christian Schrotshamer, Mondsee (AT)

(73) Assignee: BWT Aktiengesellschaft, Mondsee (AT)

( * ) Notice: Subject to any disclaimer, the term of this patent is extended or adjusted under 35 U.S.C. 154(b) by 0 days.

(21) Appl. No.: 11/973,232

(22) Filed: Oct. 5, 2007

(65) Prior Publication Data

US 2008/0087597 A1  Apr. 17, 2008

(30) Foreign Application Priority Data

Oct. 13, 2006  (DE)  ........................ 10 2006 049 084

(51) Int. Cl.
*B01D 35/30* (2006.01)
*B01D 27/08* (2006.01)

(52) U.S. Cl. ................... 210/232; 210/444; 210/450
(58) Field of Classification Search ............. 210/232, 210/444, 450
See application file for complete search history.

(56) References Cited

U.S. PATENT DOCUMENTS 4,015,959 A * 4/1977 Grote ..................... 96/136
5,484,529 A * 1/1996 Malugade et al. ........... 210/448

FOREIGN PATENT DOCUMENTS

DE  38 26 857  2/1990

\* cited by examiner

*Primary Examiner*—Thomas M Lithgow
(74) *Attorney, Agent, or Firm*—Collard & Roe, P.C.

(57) ABSTRACT

A water-conditioning cartridge has a housing that encloses an ion exchanger and can be screwed via a screw thread onto a cartridge-connecting fitting. The cartridge is provided with a water inlet for admission of untreated water, especially from a water-supply system, and with a water outlet, which is connected or can be connected to a consuming component, especially a beverage machine. To ensure that the water-conditioning cartridge can be screwed onto only a particular cartridge-connecting fitting designed for this type of water-conditioning cartridge, the housing and the cartridge-connecting fitting are each provided with a plurality of annular coding ribs, which are disposed concentrically relative to the thread axis of the screw thread, and which engage with one another when the housing is screwed onto the cartridge-connecting fitting.

13 Claims, 3 Drawing Sheets

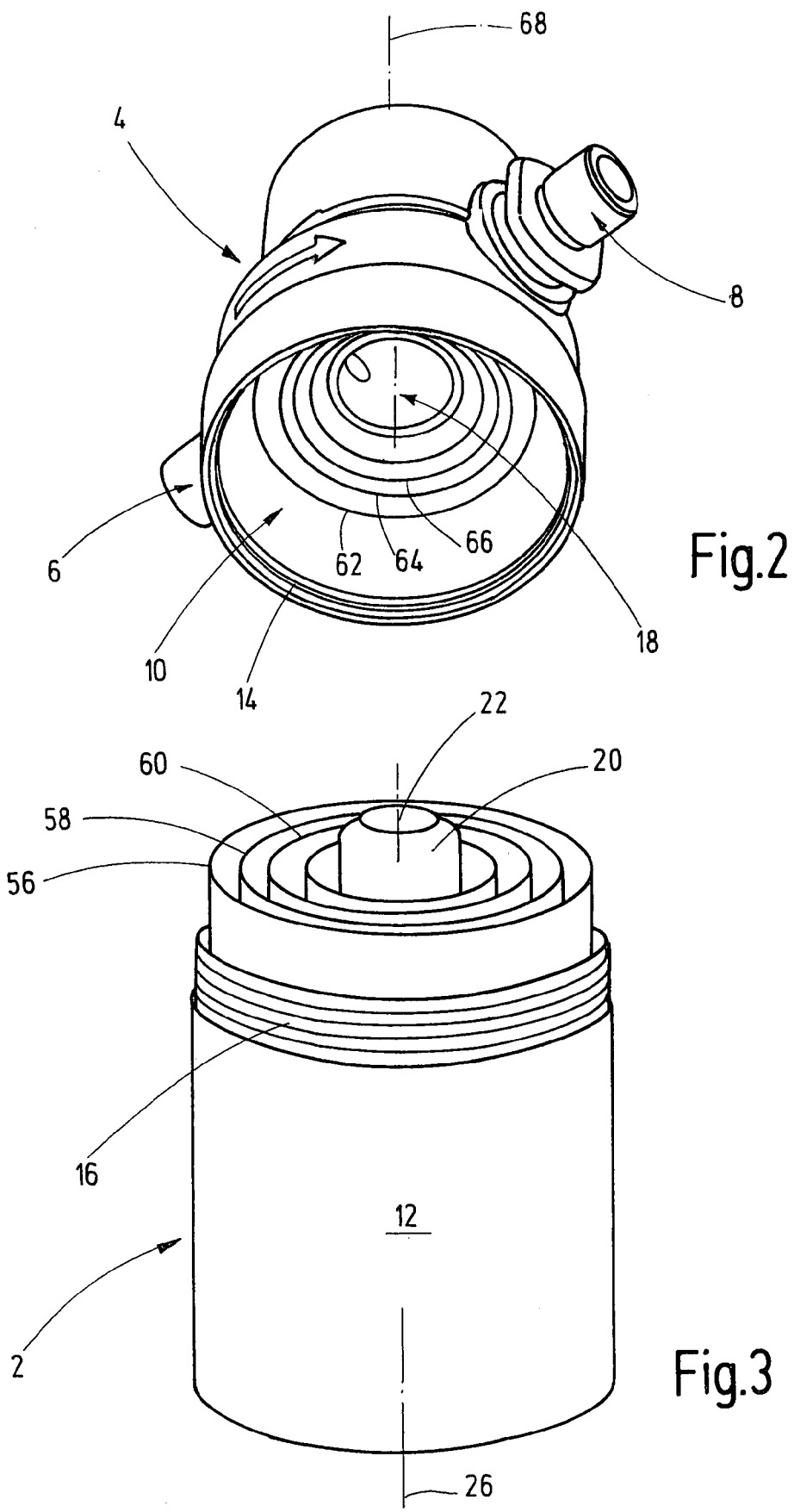

WATER-CONDITIONING CARTRIDGE

CROSS REFERENCE TO RELATED APPLICATIONS

Applicants claim priority under 35 U.S.C. 119 of German Application No. 10 2006 049 084 filed Oct. 13, 2006.

BACKGROUND OF THE INVENTION

1. Field of the Invention

The present invention relates to a water-conditioning cartridge, with a housing that encloses an ion exchanger and can be screwed via a screw thread onto a cartridge-connecting fitting. The cartridge is provided with a water inlet for admission of untreated water, especially from a water-supply system, and with a water outlet, which is connected or can be connected to a consuming component, especially a beverage machine.

2. The Prior Art

Water-conditioning cartridges of the type mentioned hereinabove are known from DE 38 26 857 A1, for example, and are used among other purposes in restaurants or cafes for conditioning of untreated water for beverage machines, such as coffee machines, when the untreated water drawn from a public water-supply system does not satisfy the requirements imposed by the operator on the flavor or other quality of the water or by the beverage machine on the purity thereof.

Different ion exchangers are contained in water-conditioning cartridges depending on the intended use. Such intended uses include partial demineralization to remove calcium and magnesium from the untreated water, complete demineralization to remove all ions from the untreated water, softening to lower the content of water hardeners or nitrate removal for health reasons. Confusion about the ion exchanger can lead among other results to impairment of the flavor of the prepared beverage or of operation of the beverage machine, for example by lime or boiler-scale deposits. Accordingly, such confusion should be prevented if at all possible, but preventing confusion cannot be assured merely by appropriate labeling of the cartridges.

In principle, it would certainly be possible to provide the water-conditioning cartridges with screw threads of different dimensions corresponding to the respective content and intended use, but doing so would necessitate producing a specific cartridge-connecting fitting with a complementary thread for each type of water-conditioning cartridge. This possibility not only causes relatively high complexity in terms of design, manufacture and warehousing, but also, in the case of replacement of the beverage machine, does not even allow the cartridge-connecting fitting to be newly reconfigured for a different water-conditioning cartridge.

SUMMARY OF THE INVENTION

In view of this background, it is an object of the invention to improve a water-conditioning cartridge of the type mentioned hereinabove to the effect that it can be screwed onto only one particular cartridge-connecting fitting, which is intended for this type of water-conditioning cartridge.

These and other objects are achieved by a water-conditioning cartridge according to the invention. The water-conditioning cartridge has a housing that encloses an iron exchanger and can be screwed via a screw thread onto a cartridge-connecting fitting, which is provided with a water inlet for admission of untreated water, especially from a water-supply system, and with a water outlet, which is connected or can be connected to a consuming component, especially a beverage machine. The housing and the cartridge-connecting fitting are each provided with a plurality of annular coding ribs, which are disposed concentrically relative to the thread axis of the screw thread and which engage with one another when they are screwed onto one another. Advantageous configurations and further developments of the invention are discussed below.

According to the invention, the housing and the cartridge-connecting fitting are each provided with a plurality of annular coding ribs. These ribs are disposed concentrically relative to the thread axis of the screw thread and engage with one another when the housing is screwed onto the cartridge-connecting fitting.

The water-conditioning cartridge according to the invention reliably prevents the attachment of a "wrong" water-conditioning cartridge onto a cartridge-connecting fitting not intended for it. For example, the coding ribs of a water-conditioning cartridge packed with a weakly acidic ion exchanger and used for partial demineralization of the untreated water match the coding ribs of a cartridge-connecting fitting designed to receive such a water-conditioning cartridge, but do not match the coding ribs of other cartridge-connecting fittings designed to receive a water-conditioning cartridge packed with a strongly acidic cation exchanger, a mixed-bed ion exchanger or a strongly basic ion exchanger.

In a preferred embodiment, a change of coding by changing the configurations of mutually matching coding ribs on the housing and fitting is achieved by inserting a coding ring captively into an annular groove between at least two adjacent coding ribs, and simultaneously removing, from the water-conditioning cartridge designed to be received in the cartridge-connecting fitting, that coding rib that is disposed opposite the at least one coding ring inserted into the annular groove. For example, the coding ring may be inserted captively by means of a clamped, adhesively bonded or latched connection. Naturally it is also possible, for the same purpose, to remove one or more coding ribs from the cartridge-connecting fitting and to insert a coding ring into the annular groove between the adjacent coding ribs, at the respective opposite location of the water-conditioning cartridge.

Preferably, water-conditioning cartridges containing different packings or designed for different consuming components, especially beverage machines, or both, will each be given a different coding, or in other words a different configuration of the coding ribs, so that only the water-conditioning cartridge designed for the respective consuming component will fit in a correspondingly coded cartridge-connecting fitting in the water line leading to the consuming component.

Before one or more coding ribs on the water-conditioning cartridge or on the cartridge-connecting fitting are removed, the number of coding ribs of the water-conditioning cartridge is preferably equal to or greater or less by one than the number of coding ribs of the cartridge-connecting fitting. As a result, aside from a radially innermost and a radially outermost coding rib, all coding ribs of the water-conditioning cartridge and of the cartridge-connecting fitting engage in an annular groove between two adjacent, oppositely disposed coding ribs. In this way, the ratio of the number of possible codings to the total number of coding ribs needed can be maximized, and thus the space requirement for a particular number of needed codings can be minimized.

In a preferred embodiment, the coding ribs of the water-conditioning cartridge project axially beyond an axial end of the housing. The housing is equipped with a male thread and is screwed into a female thread of a threaded socket of the cartridge-connecting fitting, beyond the bottom of which there project the coding ribs of the cartridge-connecting fitting.

Expediently, on its axial end engaging with the threaded socket, the housing is also provided with a connector piece for feeding the untreated water into the housing of the water-conditioning cartridge, which preferably is disposed coaxially with the screw thread and coaxially with the coding ribs projecting beyond the axial end.

To ensure that the male or female thread of a "wrong" water-conditioning cartridge cannot be partly engaged with the associated female or male thread of the cartridge-connecting fitting before the user becomes aware of the incompatibility between the water-conditioning cartridge and the cartridge-connecting fitting, a further advantageous embodiment has the crests of the coding ribs engage with one another before engagement of the two threads can take place. To achieve this arrangement, the projecting height of the respective coding ribs is greater than the engagement length of the screw thread.

In order to facilitate introduction of the coding ribs of the housing into the annular grooves between the coding ribs of the cartridge-connecting fitting, the coding ribs can be slightly tapered toward their crests or can be provided with chamfers that slope down toward the adjacent grooves, in the region of the crests, or both.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 2 is a schematic perspective view of the underside of the cartridge-connecting fitting;

FIG. 3 is a schematic perspective view of the upper part of the water-conditioning cartridge;

DETAILED DESCRIPTION OF PREFERRED EMBODIMENTS

Figure 1:
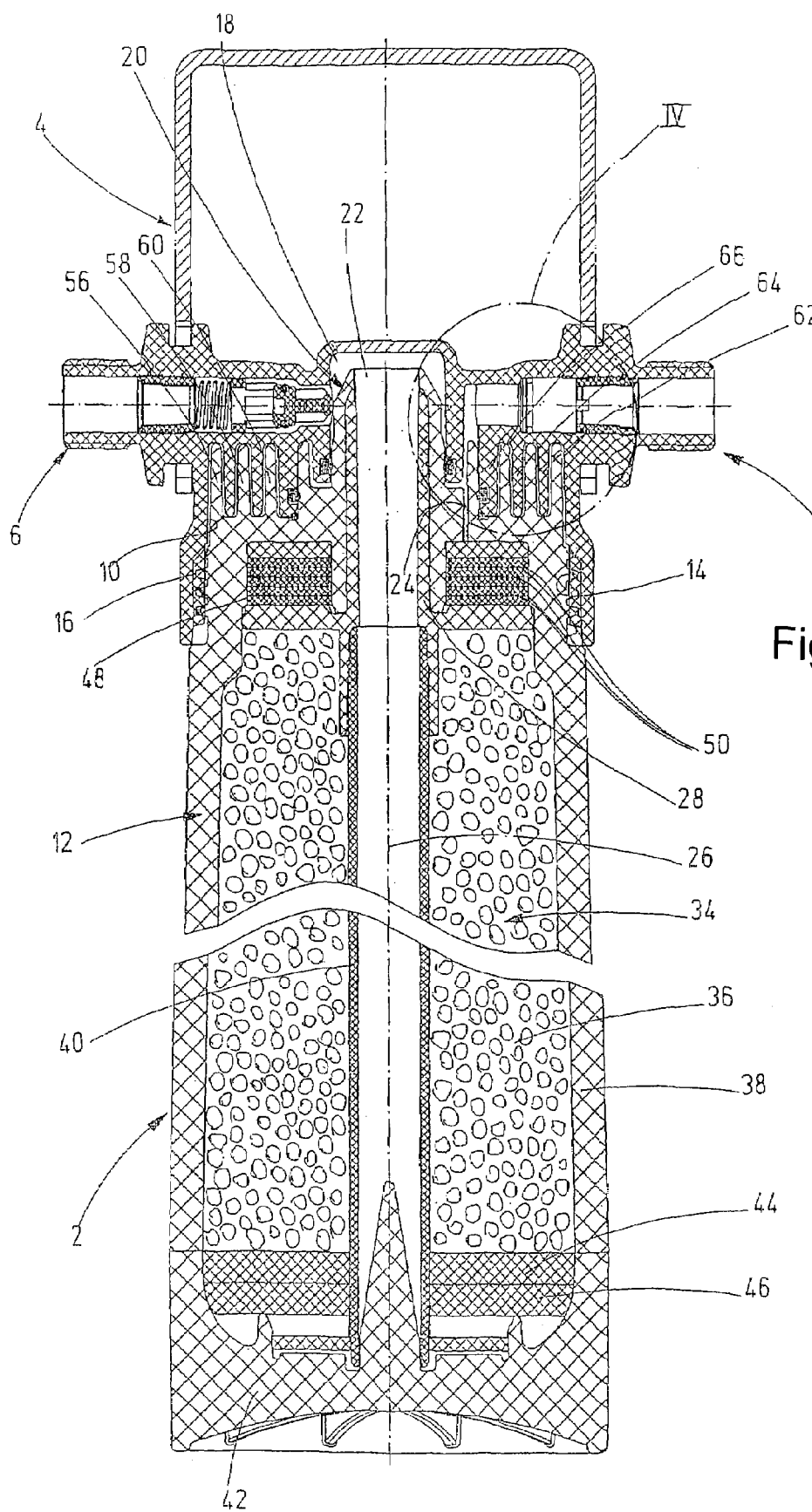
FIG. 1 is a longitudinal section through a water-conditioning cartridge according to the invention after it has been mounted on a cartridge-connecting fitting.
Figure 4:
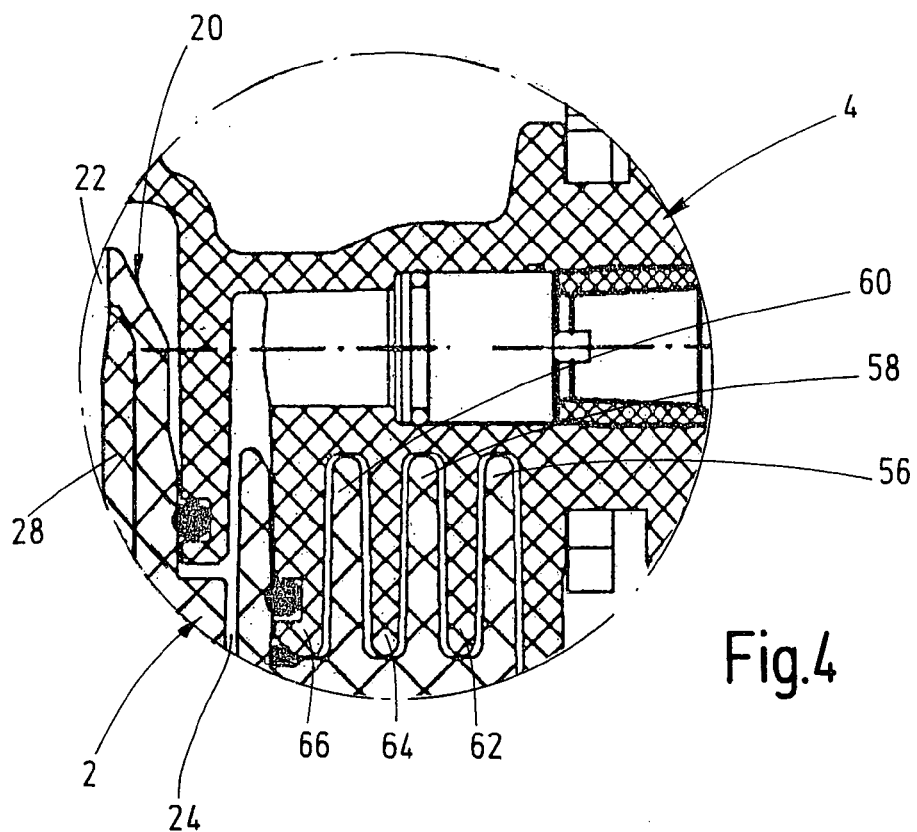
FIG. 4 is an enlarged diagram of detail IV from FIG. 1.

Referring now in detail to the drawings, FIG. 1 illustrates a water-conditioning cartridge 2 used for conditioning untreated water, for example from a water-supply system. This water is to be conditioned before being fed to a beverage machine (not illustrated). For example, the water is conditioned in order to improve the flavor of the beverage prepared in the beverage machine, to prevent deposition of poorly soluble constituents of the untreated water in the beverage machine and/or to remove unhealthy constituents such as nitrates from the untreated water.

Water-conditioning cartridge 2 can be mounted exchangeably on a cartridge-connecting fitting 4, which can be inserted, for example, downstream from a building connection of the water-supply system into a water pipe (not illustrated) leading to the beverage machine, and which includes an untreated-water inlet port 6 that can be connected to the water pipe on the water supply system side and a purified-water outlet port 8 that can be connected with the water pipe on the beverage machine side. Cartridge-connecting fitting 4 has a downwardly open threaded socket 10 for water-conditioning cartridge 2. Housing 12 of cartridge 2 is equipped, in the vicinity of its upper axial end, with a male thread 16 complementary to a female thread 14 of the threaded socket 10, so that water-conditioning cartridge 2 can be screwed into the cartridge-connecting fitting 4 from underneath, via its upper axial end, as illustrated in FIG. 1.

At its center, threaded socket 10 has a downwardly open receiving socket 18, into which there is sealingly introduced a cylindrical connector piece 20 of water-conditioning cartridge 2, which connector piece projects upwardly beyond the axial end of housing 12 and tapers conically at the upper end. After water-conditioning cartridge 2 has been screwed into threaded socket 10, the untreated water from untreated-water inlet port 6 enters, via the receiving socket 18, into an inlet aperture 22, open at the upper end of connector piece 20, of an inlet pipe 28. Inlet pipe 28 runs downward in the interior of the connector piece 20 and is coaxial with a longitudinal or central axis 26 of water-conditioning cartridge 2, while the conditioned water, after passing through water-conditioning cartridge 2, is guided separately from the inflowing untreated water through a laterally offset outlet duct 24 into purified-water outlet port 8.

Depending on the type of beverage machine and on the quality of the untreated water, conditioning of the untreated water in water-conditioning cartridge 2 is designed to take place either in the form of partial demineralization, softening or complete demineralization of the untreated water, or in the form of a removal of nitrate from the untreated water.

For this purpose, housing 12 of water-conditioning cartridge 2, which is made of plastic, encloses an ion exchanger 34, through which the untreated water is passed and whose material composition depends on the type of water conditioning desired.

For example, calcium and magnesium ions contained in the untreated water are retained in the ion-exchange material and replaced by hydrogen ions from the ion-exchange material in the case of partial demineralization in an ion exchanger 34 containing a weakly acidic ion-exchange material such as Lewatit S8229 of the Lanxess company. The water-hardening elements calcium and magnesium contained in the untreated water are exchanged for sodium from the cation-exchange material in the case of softening by means of an ion exchanger 34 containing a strongly acidic cation-exchange material such as SRLI of Rohm and Haas.

In the case of complete demineralization, on the other hand, all ions of the untreated water are removed by means of a mixed-bed ion exchanger 34, which contains both a strongly acidic cation-exchange material and a strongly basic anion-exchange material. For example, a mixed-bed ion exchanger of the type MB 50 of the DOW company can be used, so that sodium, calcium and magnesium cations contained in the untreated water are exchanged for hydrogen ions in the cation-exchange material, and bicarbonate, chloride, sulfate and nitrate anions contained in the untreated water are exchanged for hydroxyl anions in the anion-exchange material, which recombine with the hydrogen ions to form water. In the case of nitrate removal, the nitrate ions in the untreated water are replaced by chloride ions by means of an anion exchanger containing strongly basic anion-exchange material, such as that of the IMAC HP555 type.

The exchange material of ion-exchanger 34 is packed, in the form of a bed of granules, into an annular space 36 between an outer circumferential wall 38 of housing 12 and a downpipe 40, which extends along the longitudinal or central axis 26 of the housing into the vicinity of its closed lower axial end 42, and whose upper axial end is joined sealingly to the inlet pipe 28. Via downpipe 40, the untreated water fed from untreated-water inlet port 6 into inlet pipe 28 is passed downward along the longitudinal or central axis 26 of water-conditioning cartridge 2. After exiting from downpipe 40 and before entering ion exchanger 34, the untreated water passes through two fine-meshed screens 44, 46, which support the bed of granules and in which particulate impurities are filtered out of the untreated water.

The prefiltered untreated water then ascends through annular space 36 containing ion exchanger 34, and, depending on the ion-exchange material being used, all or part of the ions contained in the untreated water are removed or replaced by other ions, as explained hereinabove. In a chamber 48 disposed above the bed of granules and in communication with annular space 36 via connecting ducts (not visible), there is located a further filter packet 50 including filters disposed in series in the flow path of the conditioned water, for example an activated charcoal filter and a further fine filter. The activated charcoal filter includes a nonwoven or woven fabric of activated charcoal fibers and removes odor substances, flavor substances, and oxidizing chemicals from the water. The further fine filter is intended to retain suspended solids and particles that may have penetrated into cartridge 2 itself. After passing through filter packet 50, the conditioned and filtered water flows through outlet duct 24 into purified-water outlet port 8, from which it is delivered to the beverage machine.

To ensure, on the one hand, that water-conditioning cartridges 2 having substantially identical construction and merely containing a different ion exchanger 34, depending on the type of water conditioning desired, are used for all types of water conditioning, thus reducing costs, and on the other hand to reliably prevent a water-conditioning cartridge 2 containing a "wrong" ion exchanger 34 unsuitable for the beverage machine connected to the purified-water outlet port from being mounted on a cartridge-connecting fitting 4, water-conditioning cartridge 2 and cartridge-connecting fitting 4 are provided with complementary coding ribs 56, 58, 60, and 62, 64 and 66. These ribs permit mounting of a water-conditioning cartridge 2 packed only with the desired ion exchanger 34 on the associated cartridge-connecting fitting 4.

As is best illustrated in FIGS. 1 and 3, coding ribs 56, 58, 60 of water-conditioning cartridge 2 are formed in such a way that, while being disposed at a radial spacing from one another, they annularly surround the thread axis of male thread 16 formed by the longitudinal or central axis 26, and are oriented coaxially with this axis 26. Correspondingly, coaxial coding ribs 62, 64 and 66 of cartridge-connecting fitting 4, while being disposed at a radial spacing from one another, annularly surround a thread axis 68 of female thread 14 of threaded socket 10, which axis coincides with longitudinal or central axis 26 or, in other words, the thread axis of male thread 16, after cartridge 2 has been firmly screwed on.

For this purpose, coding ribs 56, 58, 60 of water-conditioning cartridge 2 project beyond an axial end of housing 12 surrounding connector piece 2. Coding ribs 62, 64, 66 of cartridge-connecting fitting 4 project beyond the oppositely disposed bottom of threaded socket 10.

The distance of coding ribs 56, 58, 60 on the housing from the thread axis of male thread 16 is matched to the distance of coding ribs 62, 64, 66 on the fitting from the thread axis of female thread 14. The distances are matched so that coding ribs 56, 58, 60 mesh in comb-like manner with coding ribs 62, 64, 66 when water-conditioning cartridge 2 with the connector piece 20 at the front is introduced into threaded socket 10 of cartridge-connecting fitting 4 and becomes aligned relative to the cartridge-connecting fitting 4 upon entry of connector piece 20 into the receiving socket 18. In other words, coding ribs 56, 58, 60 on the housing are radially offset relative to coding ribs 62, 64 and 66 on the fitting, so that each engages in an annular groove between two adjacent coding ribs 62, 64, 66 on the fitting and vice versa.

The projecting height of coding ribs 56, 58, 60 and 62, 64 and 66 beyond the end face of housing 12 and beyond the bottom of threaded socket 10, respectively, is greater than the radial wall thickness of coding ribs 56, 58, 60 and 62, 64, 66, respectively. Preferably, the projecting height is also greater than the engagement length of the two threads 16, 14. In this way, the crests of coding ribs 56, 58, 60 and 62, 64, 66, respectively, already engage in one another before the two threads 16, 14 engage with one another.

In order to facilitate introduction of coding ribs 56, 58, 60 of the housing into the annular grooves between coding ribs 62, 64, 66 of cartridge-connecting fitting 4, coding ribs 56, 58, 60 and 62, 64, 66, respectively, are slightly tapered from their base to their crest and additionally are provided, in the region of their crest, with chamfers that slope down toward the adjacent annular grooves.

In the exemplary embodiment illustrated in FIGS. 1 to 4, of a cartridge-connecting fitting 4 and of a water-conditioning cartridge 2 designed for use with this fitting 4, all coding ribs 56, 58, 60 on the housing and all coding ribs 62, 64, 66 on the fitting are respectively disposed at approximately equal distances from one another.

Figure 5:
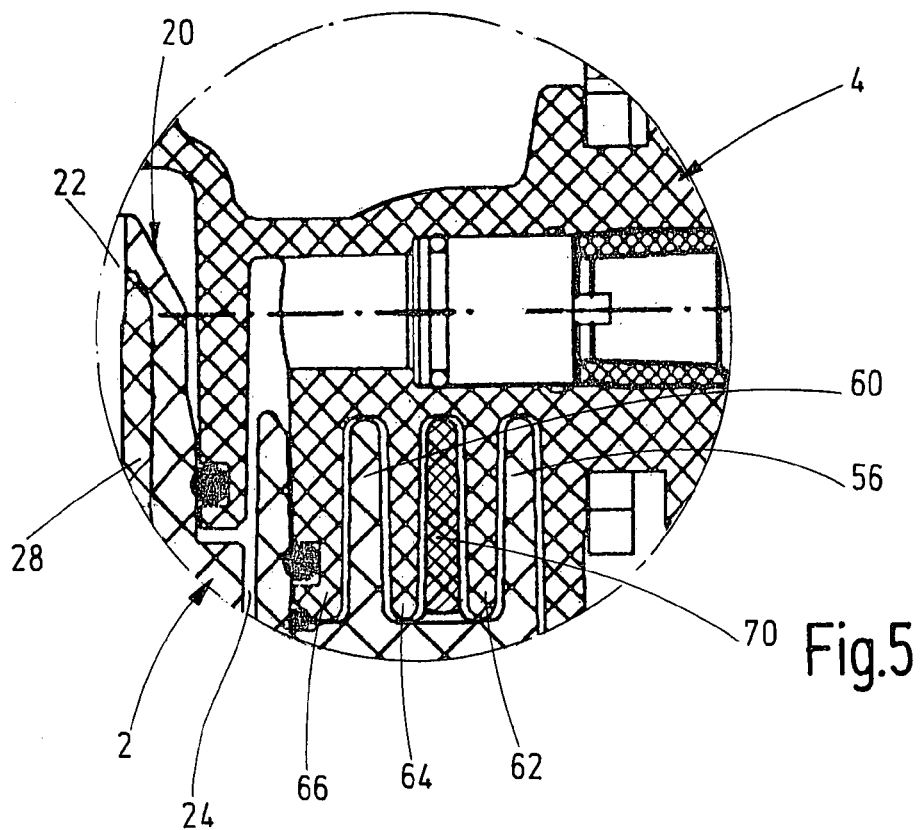
FIG. 5 is a view corresponding to FIG. 4, but of a cartridge-connecting fitting and water-conditioning cartridge with different coding.

In the embodiment illustrated in FIG. 5, of a cartridge-connecting fitting 4 and of a water-conditioning cartridge 2 designed for use with this fitting 4 but packed with a different ion exchanger 34, cartridge-connecting fitting 4 additionally surrounds a coding ring 70 inserted firmly between the two adjacent coding ribs 62 and 64. In this embodiment, coding rib 58 is missing from the corresponding position of the associated water-conditioning cartridge 2. This recoding ensures that water-conditioning cartridge 2 illustrated in FIGS. 1 to 4 does not fit into cartridge-connecting fitting 4 illustrated in FIG. 5, and also that water-conditioning cartridge 2 illustrated in FIG. 5 does not fit into cartridge-connecting fitting 4 illustrated in FIGS. 1 to 4, and therefore cartridge-connecting fitting 4 cannot be accidentally equipped with a "wrong" water-conditioning cartridge 2.

To undertake recoding, coding ring 70 on cartridge-connecting fitting 4 can be captively clamped, pressed, adhesively bonded or latched between adjacent coding ribs 62, 64. The missing coding rib 58 on housing 12 of water-conditioning cartridge 2 can be produced, for example during injection molding of the housing, by introducing, at this location, a corresponding mold insert between two adjacent ridges that project into the mold cavity of the injection-molding mold, in order to form the annular grooves between coding ribs 56 and 60 during injection molding. Alternatively, however, coding rib 58 can also be subsequently removed by milling.

Given a starting number of three coding ribs 56, 58, 60 on the housing and three coding ribs 62, 64, 66 on the fitting, respectively, a total of seven different codings is possible by inserting one or two coding rings 70 into the annular grooves between coding ribs 62, 64, 66 in the bottom of threaded socket 10 and by corresponding removal of one or two coding ribs 56, 58, 60 from the end face of the housing 12. Thus, besides the aforesaid possible types of water conditioning, namely partial demineralization, softening, complete demineralization and nitrate removal, provisions can be made, for example, for another three different types of filtration of the untreated water in the water-conditioning cartridge or for three different types of beverage machines with different requirements.

The number of possible different codings can be doubled when, as an additional variant of recoding, one or two coding ribs 62, 64, 66 is or are removed from the bottom of threaded socket 10 of cartridge-connecting fitting 4 and, correspondingly, one or two coding rings 70 is or are inserted into the annular grooves between coding ribs 56, 58, 60 at the axial end of housing 12 of water-conditioning cartridge 2.

In principle, coding can also be used to prevent imitation cartridges of unknown origin from being screwed into the cartridge-connecting fitting.

The cartridge-connecting fitting does not have to be a separate fitting, but instead could also be a fitting integrated into a beverage machine.

Although only a few embodiments have been shown and described, it is to be understood that many changes and modifications may be made thereunto without departing from the spirit and scope of the invention as defined in the appended claims.

What is being claimed is:

1. A water-conditioning cartridge comprising
   (a) a housing comprising a plurality of annular coding housing ribs;
   (b) an ion exchanger enclosed within the housing;
   (c) a cartridge-connecting fitting comprising a plurality of annular coding fitting ribs;
   (d) a water inlet for admission of untreated water;
   (e) a water outlet for connection to a consuming component; and
   (f) a screw thread for connecting the housing with the cartridge-connecting fitting, said screw thread comprising a thread axis;
   wherein said annular coding housing ribs and said annular coding fitting ribs are disposed concentrically relative to the thread axis and engage with one another when screwed onto one another.

2. The water-conditioning cartridge according to claim 1, further comprising a coding ring inserted between at least two adjacent coding housing or fitting ribs.

3. The water-conditioning cartridge according to claim 2, wherein the coding ring is held captively by a clamped, adhesively bonded or latched connection.

4. The water-conditioning cartridge according to claim 1, wherein n represents the number of the coding housing ribs and n, n−1, or n+1 represents the number of the coding fitting ribs, where n is a whole natural number>1.

5. The water-conditioning cartridge according to claim 1, wherein a different number of coding housing ribs is provided for differently packed water-conditioning cartridges or for different consuming components.

6. The water-conditioning cartridge according to claim 1, wherein a change in the number of coding housing or fitting ribs is made by inserting at least one coding ring between two adjacent fitting ribs or by removing a housing rib disposed opposite the at least one coding ring.

7. The water-conditioning cartridge according to claim 1, wherein the housing coding ribs project axially beyond an axial end of the housing.

8. The water-conditioning cartridge according to claim 7, wherein the coding housing ribs have a projecting height greater than an engagement length of the screw thread.

9. The water-conditioning cartridge according to claim 1, wherein all coding housing ribs have approximately identical average wall thickness.

10. The water-conditioning cartridge according to claim 1, wherein the coding housing ribs are slightly tapered toward crests of the housing ribs.

11. The water-conditioning cartridge according to claim 1, wherein adjacent coding housing ribs are separated by annular grooves.

12. The water-conditioning cartridge according to claim 1, wherein the housing comprises a connector piece and the coding housing ribs annularly surround said connector piece.

13. The water-conditioning cartridge according to claim 12, wherein the coding housing ribs are oriented coaxially with the connector piece.

* * * * *